US009226203B2

(12) United States Patent
Tabet et al.

(10) Patent No.: US 9,226,203 B2
(45) Date of Patent: Dec. 29, 2015

(54) METHOD FOR IMPLEMENTING AUTONOMOUS MANAGEMENT OF RADIO RESOURCES ACROSS DUAL NETWORKS

(75) Inventors: Tarik Tabet, Los Gatos, CA (US); Syed A. Mujtaba, Santa Clara, CA (US); Xiaowen Wang, Cupertino, CA (US); Paul Flynn, Menlo Park, CA (US); Kee-Bong Song, Santa Clara, CA (US); Vinay Majjigi, Sunnyvale, CA (US); Youngjae Kim, San Jose, CA (US); Yuchul Kim, Santa Clara, CA (US); Christian Mucke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 13/599,289

(22) Filed: Aug. 30, 2012

(65) Prior Publication Data
US 2013/0272212 A1 Oct. 17, 2013

Related U.S. Application Data

(60) Provisional application No. 61/622,732, filed on Apr. 11, 2012.

(51) Int. Cl.
*H04W 36/00* (2009.01)
*H04W 88/06* (2009.01)
*H04W 76/04* (2009.01)

(52) U.S. Cl.
CPC .......... *H04W 36/0066* (2013.01); *H04W 88/06* (2013.01); *H04W 36/0088* (2013.01); *H04W 76/048* (2013.01)

(58) Field of Classification Search
CPC . H04W 72/0413; H04W 24/10; H04W 72/04; H04W 24/02; H04W 72/0406; H04W 72/042; H04W 36/0066; H04W 36/0083; H04W 68/12; H04W 36/0088; H04W 36/08; H04W 56/00; H04W 76/048; H04W 88/06; H04L 5/0053; H04L 5/0055; H04L 1/0026; H04L 5/001; H04L 1/1861; H04B 7/0626

USPC ................ 370/329, 252, 328, 280, 311, 336; 455/439, 436
See application file for complete search history.

(56) References Cited

U.S. PATENT DOCUMENTS

2002/0111169 A1\* 8/2002 Vanghi .......................... 455/436
2007/0097922 A1\* 5/2007 Parekh et al. .................. 370/332
(Continued)

FOREIGN PATENT DOCUMENTS

TW 201210373 3/2012
WO 2007050920 5/2007
(Continued)

OTHER PUBLICATIONS

LTE Protocol Overview, Oct. 2008.\*
(Continued)

*Primary Examiner* — Un C Cho
*Assistant Examiner* — Oussama Roudani
(74) *Attorney, Agent, or Firm* — Meyertons Hood Kivlin Kowert & Goetzel, P.C.; Jeffrey C. Hood; Joel L. Stevens

(57) ABSTRACT

Managing radio resources across dual networks includes a wireless mobile device connecting to a first wireless network using a first radio access technology. The wireless device may notify the first network of a capability to be temporarily non-responsive to the first network while maintaining a signaling connection to the first network. The wireless device may communicate with a second network. The wireless device may return to communicating with the first network subsequent to communicating with the second network, and in response to communicating with the second network for less than a predetermined amount of time, the wireless device may send a scheduling request to the first network. In response to receiving a grant acknowledgement from the first network, the wireless device may send a buffer status report that includes a value such as zero to indicate that the wireless device has returned to and can communicate with the first network.

15 Claims, 5 Drawing Sheets

(56) References Cited

U.S. PATENT DOCUMENTS

| | | |
|---|---|---|
| 2008/0117859 A1 | 5/2008 | Shahidi et al. |
| 2008/0205345 A1* | 8/2008 | Sachs et al. ................... 370/332 |
| 2009/0239533 A1* | 9/2009 | Somasundaram et al. .... 455/434 |
| 2009/0279517 A1 | 11/2009 | Chin et al. |
| 2009/0280802 A1 | 11/2009 | Chin et al. |
| 2010/0034126 A1 | 2/2010 | Kitazoe et al. |
| 2010/0070814 A1 | 3/2010 | Damnjanovic et al. |
| 2010/0267410 A1 | 10/2010 | Chin et al. |
| 2011/0149907 A1 | 6/2011 | Olsson et al. |
| 2012/0044880 A1 | 2/2012 | Sun et al. |
| 2012/0281566 A1* | 11/2012 | Pelletier et al. ............... 370/252 |
| 2013/0242726 A1* | 9/2013 | Zhu et al. ...................... 370/229 |

FOREIGN PATENT DOCUMENTS

| | | |
|---|---|---|
| WO | 2007051184 | 5/2007 |
| WO | 2012024844 | 3/2012 |

OTHER PUBLICATIONS

International Search Report and Written Opinion in application No. PCT/US2013/035451 mailed Jun. 18, 2013 pp. 1-14.

International Preliminary Report on Patentability from PCT/US2013/035451, issued Oct. 23, 2014, Apple Inc., pp. 1-10.

Office Action from Taiwanese Application No. 102112743, issued Feb. 16, 2015, English and Chinese versions, pp. 1-16.

\* cited by examiner

METHOD FOR IMPLEMENTING AUTONOMOUS MANAGEMENT OF RADIO RESOURCES ACROSS DUAL NETWORKS

PRIORITY CLAIM

The present application claims benefit of priority to U.S. Provisional Application No. 61/622,732 entitled "Method for Implementing Autonomous Management of Radio Resources Across Dual Networks" and filed on Apr. 11, 2012, whose inventors are Tarik Tabet, Syed A. Mujtaba, Xiamen Wang, Paul Flynn, Kee-Bong Song, Vinay Majjigi, Youngjae Kim, Yuchul Kim, and Christian Mucke, and which is hereby incorporated by reference in its entirety.

BACKGROUND

1. Technical Field

This disclosure relates to wireless communication devices, and more particularly to single radio wireless devices communicating on multiple radio access technologies.

2. Description of the Related Art

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of mobile wireless devices. A representative wireless network may include simultaneous support for the 3$^{rd}$ Generation Partnership Project (3GPP) Long Term Evolution (LTE) wireless communication standard and the 3$^{rd}$ Generation Partnership Project 2 (3GPP2) CDMA2000 1x (also referred to as 1xRTT or 1x or IS-2000) wireless communication standard. This representative "simultaneous" wireless network can support circuit switched voice connections through a first wireless network that uses the CDMA2000 1x wireless communication protocol and packet switched connections (voice or data) through a second wireless network that uses the LTE wireless communication protocol. The 3GPP wireless communications standards organization develops mobile communication standards that include releases for Global System for Mobile Communications (GSM), General Packet Radio Service (GPRS), Universal Mobile Telecommunications System (UMTS), Long Term Evolution (LTE) and LTE Advanced standards. The 3GPP2 wireless communications standards organization develops mobile communication standards that include CDMA2000 1xRTT and 1xEV-DO standards.

Some mobile wireless devices may include functionality to support simultaneous access to more than one wireless network and thus more than one radio access technology. Some of these devices include dual circuits to access two such networks. Although useful, some of these dual devices consume a great deal of power when compared to their single circuit counterparts.

More particularly, the single circuit devices which may be referred to as single chip device or single radio devices, may also support access to more than one radio access technology and thus more than one wireless network. However, the single radio devices may only access one network at a time. For example, a single radio user equipment (UE) device may connect to or camp on an evolved Universal Mobile Telecommunications System (UMTS) Terrestrial Radio Access Network (eUTRAN) of the LTE wireless network and also connect to or camp on a radio access network (RAN) of the CDMA2000 1x wireless network, but not to both wireless networks simultaneously. Some of these UEs may camp on one of the networks and then tune away from that network at some interval to check for incoming messages or calls on the other network.

However, there may be issues that arise when the UE tunes away from the first network because the first network may have no knowledge that the UE has tuned away. For example, the first network may waste downlink capacity by unnecessarily allocating downlink resources to the UE during the tune-away operation. As another example, the first network may penalize the UE by reducing its future downlink allocations, for example, since the UE does not respond to commands from the first network during the tune-away operation.

SUMMARY OF THE EMBODIMENTS

Various embodiments of a method for implementing autonomous management of radio resource across dual networks are disclosed. Broadly speaking, a method is contemplated in which a wireless mobile device may operate in a first mode according to a first radio access technology such as the LTE wireless protocol for example, to communicate with a first wireless network. The wireless mobile device may notify the first wireless network of a capability to operate in a second mode and to be temporarily non-responsive to the first network while maintaining a signaling connection to the first wireless network. For example, the wireless mobile device may tune-away from the first wireless network to monitor activity such as paging activity on a second wireless network. Accordingly, the wireless device may notify the first wireless network of this capability. The wireless device may, subsequent to operation in the first mode, operate in the second mode according to a second radio access technology such as the IS-2000 wireless protocol to communicate with the second network. The wireless device may return to operation in the first mode subsequent to operation in the second mode, and in response to operating in the second mode for less than a predetermined amount of time, the wireless device may send scheduling request to the first wireless network. In response to receiving a grant acknowledgement from the first wireless network, the wireless mobile device may send a buffer status report that includes a predetermined value such as zero, for example, to the first wireless network to indicate that the wireless mobile device has returned.

Figure 1:
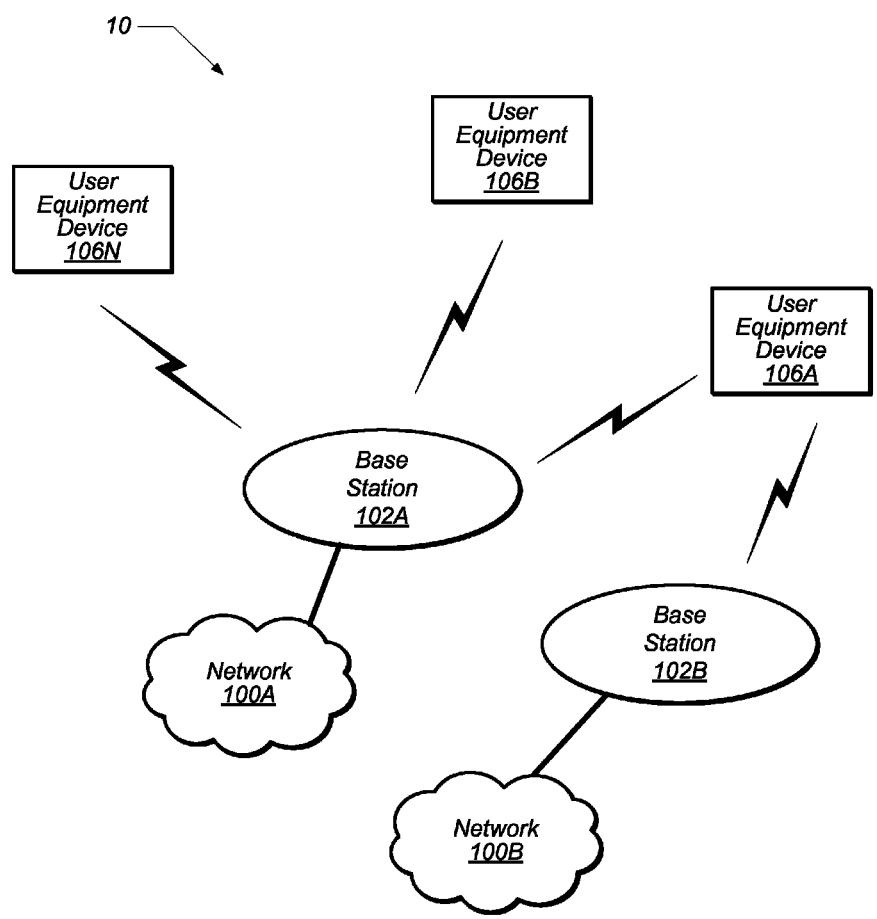
FIG. 1 is a block diagram of one embodiment of a wireless communication system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

As mentioned above, some wireless devices may have the capability to operate in a number of radio access technologies. Further, some devices may operate in a primary technology or standard, and operate in one or more additional technologies when the primary technology is unavailable, or the device selects a different technology. More particularly, as described further below a wireless device may operate in a radio access technology that is compliant with the $3^{rd}$ Generation Partnership Project (3GPP) Long Term Evolution (LTE) standard. As such, the wireless device may operate using an Internet Protocol (IP) using packet switched techniques. The wireless device may also operate in a radio access technology that is compliant with one or more versions of the older code division multiplex (CDMA) CDMA2000 standards such as the CDMA2000 1x (typically referred to as IS-2000) standard, for example. In this operational mode, the wireless device may operate using circuit switched techniques for both voice and data. For a variety of reasons including higher data rates, the wireless device may preferentially operate according to the LTE standard, and then seamlessly switch to the IS-2000 standard as necessary. For example, the wireless device may tune away from the LIE mode for short durations to monitor IS-2000 activity such as to check for incoming calls, for example.

However, as mentioned above, when the wireless device enters tune-away operation, the network to which it was connected may not know that the device has tuned away. Thus to manage radio resources across networks, in the following embodiments of FIG. 1 through FIG. 3, a wireless communication system and device are described in which a wireless device may notify the first network that it supports the tune-away mode. The first network may acknowledge that it also supports the tune-away mode. To reduce the need for the wireless device to perform a random access channel (RACH) procedure upon returning from the tune-away mode, and to reduce unnecessary resource scheduling by the first network, the wireless device may be configured to notify the first network of the tune-away capability, to keep track of the duration of the tune-away mode when it enters the tune-away mode, and to perform a procedure to notify the first network that it has returned.

Turning now to FIG. 1, a block diagram of one embodiment of a wireless communication system is shown. It is noted that the system of FIG. 1 is merely one example of any of a variety of wireless communication systems. The wireless communication system 10 includes a base station 102A which communicates over a wireless transmission medium (as indicated by the zig-zag) with one or more user equipment (UE) devices (e.g., 106A through 106N). The base station 102A is also coupled a network 100A via another interface, which may be wired or wireless. The wireless communication system 10 also includes a base station 102B which communicates over a wireless transmission medium (also indicated by the zig-zag) with UE devices 106A. Similar to base station 102A, base station 102B is also coupled another network (e.g., 100B) via another interface, which may be wired or wireless. It is noted that components identified by reference designators that include both a number and a letter may be referred to by the number only where appropriate.

The base stations 102 may each be a base transceiver station (BTS) or cell site, and may include hardware that enables wireless communication with one or more of the UEs 106. The base stations 102 may also be equipped to communicate with the network 100. Thus, the base stations 102 may facilitate communication between the UEs 106 and/or between the UEs 106 and the networks 100. The communication area (or coverage area) of a base station 102 may be referred to as a "cell." In various embodiments, the base stations 102 and the UEs may be configured to communicate over the transmission medium using any of various wireless communication radio access technologies such as LTE, GSM, CDMA, WLL, WAN, WiFi, WiMAX, etc.

In one embodiment, each of the UEs 106A-106N may be representative of a device with wireless network connectivity such as a mobile phone, a hand-held device, a computer or a tablet, or virtually any type of wireless device. As described further below, the UE 106 may include at least one processor (shown in FIG. 2) that is configured to execute program instructions stored in a memory (also shown in FIG. 2). Accordingly, in some embodiments, the UE 106 may perform one or more portions of the functionality described below by executing such stored instructions. However, in other embodiments, the UE 106 may include one or more hardware elements and/or one or more programmable hardware elements such as an FPGA (field-programmable gate array) that may be configured to perform the one or more portions the functionality described below. In still other embodiments, any combination of hardware and software may be implemented to perform the functionality described below.

As described further below in conjunction with the descriptions of FIG. 2 and FIG. 3, in some embodiments, the UE 106 may be configured to initiate a connection to more than one wireless network, while communicating with only one network at a time. Thus, the UE 106 may maintain a signaling connection with more than one network, while communicating with another network. More particularly, the UE (e.g., 106A) may preferentially communicate with one of the networks (e.g., 100A), and then tune away from that network at predetermined intervals to listen or monitor the other network (e.g., 100B) for activity. To more effectively manage network and UE resources, the UE 106 may be configured to notify the network 100A that it is capable of tuning away from the network 100A to another network (e.g., 100B). The network 100A may then acknowledge the notification. Once the UE 106 initiates the tune-away mode, the UE 106 may start a timer to track the duration of the tune-away mode. When the UE 106 returns from the tune-away mode, the UE 106 may check the timer to determine whether a predetermined time threshold has been exceeded. If the threshold has not been exceeded, the UE 106 may issue a scheduling request to the network 100A, which notifies the network that the UE 106 is back. If the network 100A acknowledges the request with a grant, the UE 106 may send data if it has data to send, or it may send a buffer status report that is set to a predetermined number such as zero, for example. However, if the predetermined time threshold has been exceeded, the UE 106 may initiate a scheduling request using a random access channel (RACH) procedure.

Figure 2:
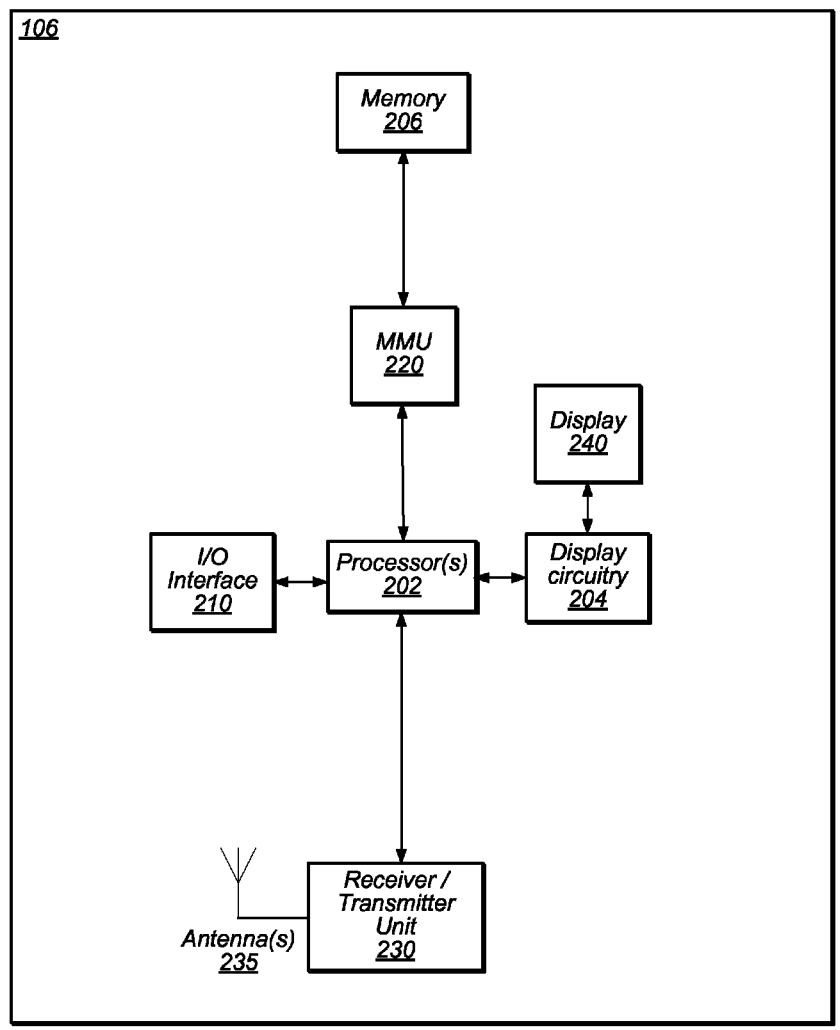
FIG. 2 is a block diagram of one embodiment of a wireless communication device shown in FIG. 1.

Referring to FIG. 2, a block diagram of one embodiment of a user equipment (UE) device shown in FIG. 1 is shown. It is noted that components that correspond to components shown in FIG. 1 are numbered identically for clarity and simplicity. The UE 106 includes processor(s) 202 (or processor core(s) 202) which is coupled to display circuitry 204 which is in turn coupled to the display 240. The processor(s) 202 is also coupled to a memory management unit (MMU) 220 and to a receiver/transmitter (R/T) unit 230. The MMU 220 is coupled to a memory 206. The UE 106 also includes an I/O interface 210 that is coupled to the processor(s) 202, and may be used for coupling the UE 106 to a computer system, or other external device. It is noted that in one embodiment the components shown within UE 106 of FIG. 2 may be manufactured as stand alone components. However, it is contemplated that in other embodiments various ones of the components may be part of one or more chipsets, or they may be part of a system on chip (SOC) implementation.

In various embodiments, the processors 202 may be representative of a number of different types of processors that may be found in a wireless communications device. For example, processor(s) 202 may include general processing capability, digital signal processing capability, as well as hardware accelerator functionality, as desired. The processor(s) 202 may include baseband processing and therefore may digitally process the signals received by the R/T unit 230. The processor(s) 202 may also process data that may be transmitted by the R/T unit 230. The processor(s) 202 may also perform a number of other data processing function such as running operating system and user applications for the UE 106.

In one embodiment, the MMU 220 may be configured to receive addresses from the processor(s) 202 and to translate those addresses to locations in memory (e.g., memory 206) and/or to other circuits or devices, such as the display circuitry 204, R/T unit 230, and/or display 240. The MMU 220 may also return data to the processor(s) 202 from the locations in memory 206. The MMU 220 may be configured to perform memory protection and page table translation or set up. In some embodiments, the MMU 220 may be included as a portion of the processor(s) 202. The display circuit 204 may be configured to perform graphics processing and provide display signals to the display 240.

The R/T unit 230 may, in one embodiment, include analog radio frequency (RF) circuitry for receiving and transmitting RF signals via the antenna 235 to perform the wireless communication. The R/T unit 230 may also include down-conversion circuitry to lower the incoming RF signals to the baseband or intermediate frequency (IF) as desired. For example, the R/T unit 230 may include various RF and IF filters, local oscillators, mixers, and the like. Since the UE 106 may operate according to a number of radio access technologies, the R/T unit 230 may include a corresponding number of RF front end portions to receive and down-convert, as well as up-convert and transmit the respective RF signals of each technology. For example, in one specific implementation, the R/T unit 230 may include an LTE front end and an IS-2000 front end.

In various embodiments, the processor(s) 202 may execute software stored with a memory such as memory 206, for example, to perform functionality associated with the tune-away mode as mentioned above. In other embodiments however, the UE 106 may include hardware associated with the processor(s) 202 and/or the R/T 230 to perform functionality associated with the tune-away mode as mentioned above. In still other embodiments, the UE 106 may include any suitable combination of hardware, firmware and/or software to perform functionality associated with the tune-away mode as mentioned above, and described further below in conjunction with the description of FIG. 3.

Figure 3:
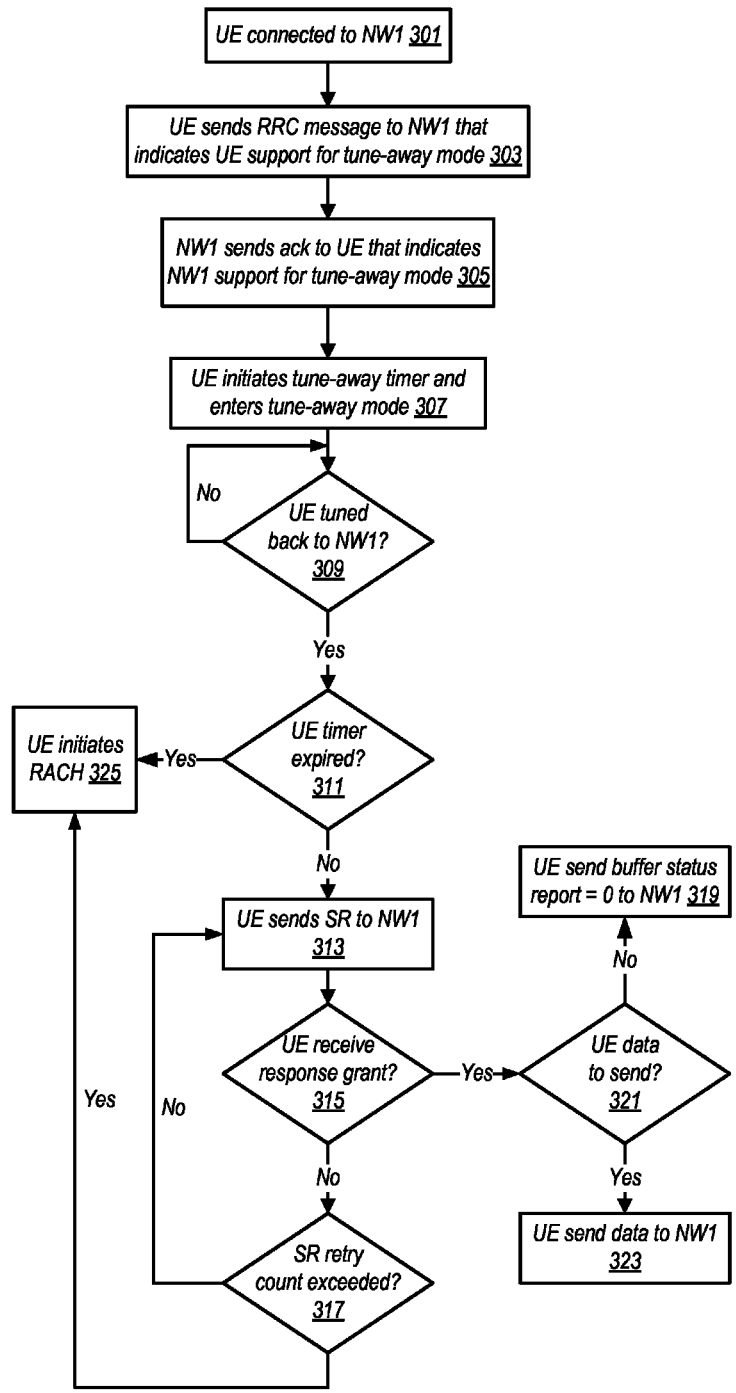
FIG. 3 is a flow diagram depicting the operation of one embodiment of the wireless communication device shown in FIG. 2.

In FIG. 3, a flow diagram depicting the operation of one embodiment of the wireless user equipment device shown in FIG. 2 is shown. Referring collectively to FIG. 1 through FIG. 3 and beginning in block 301 of FIG. 3, the UE 106 may be connected to a first wireless network (e.g., NW1) and may be operating, for example in the LTE timeline. During initiation of the connection, in one embodiment, the UE 106 may send a radio resource control (RRC) message to the network NW1 (block 303). In one embodiment, the RRC message may include a UE capability information message that would notify the network that the UE 106 supports tune-away mode. In one embodiment, the notification may be included within the information elements within the message and may include a new value of an existing parameter of the radio access technology (RAT) type. In another embodiment, the notification may be included within the message and may correspond to a new information element within the UE-EUTRA Capability container information element. In another embodiment, the notification may be included within the message and may correspond to a new value of an existing parameter of the feature group indicator (FGI). In addition, the UE 106 may also include in the RRC message information about the start time and periodicity of the tune-away mode.

In response to the RRC message the network (NW1) may respond to the UE 106 with an acknowledgement message that indicates that the NW1 supports the tune away mode (block 305). More particularly, in one embodiment, the network may respond with an RRC reconfiguration message that may include a new information element. This RRC reconfiguration message may follow the exchange of UE capability information. However, it is noted that there is no requirement for the UE 106 to send the notification message to the network, and there is no requirement for the network to respond with the acknowledgement messages described in blocks 303 and 305.

During operation in the LTE timeline, the UE 106 may, at predetermined intervals, tune away from the LTE timeline to another network such as for example, an IS-2000 network (NW2) to monitor IS-2000 paging activity (e.g., check for any incoming IS-2000 calls or data activity) (block 307). For example, in one embodiment, the UE 106 may check for QPCH indicators, or the UE 106 may check for IS-2000 paging messages. However, prior to entering the tune-away mode, the UE 106 starts a tune-away timer to track the duration that the UE 106 is tuned away from the NW1. In one embodiment, the tune-away timer of the UE 106 may correspond to a software-controlled timer, while in alternative embodiments, the UE 106 may include hardware tinier logic.

Operation may continue in the IS-2000 timeline for an indeterminate amount of time depending on what type of activity is occurring (block 309). Generally, in the tune-away mode, if the signal strength allows for checking of the QPCH indicators and there are no incoming calls, the time spent away from the LTE timeline may be relatively short. However, if the UE 106 is required to service an incoming circuit switched call, for example, the duration could be long.

If operation in the IS-2000 timeline is complete (block 309), then the UE 106 may check to see if the elapsed time according to the tune-away timer has exceeded a predetermined time threshold (block 311). If the elapsed time has exceeded the predetermined time threshold, the UE 106 may initiate a scheduling request (SR) to the NW1 using a random access channel (RACH) procedure (block 325). The RACE procedure may correspond to a re-initiation of a timing synchronization between the UE 106 and the NW1. There may be various reasons for initiating a RACH procedure. For example, due to LTE inactivity during the tune-away, there is now a reduced period of time until the UE 106 must send a RACH for time alignment. In addition, in the case of any downlink data, the network NW1 may be unaware of the sync state of the UE 106. Thus, the network NW1 will send a physical downlink control channel (PDCCH) command requesting a RACH procedure. Further, in the case of any pending uplink data, the UE 106 will likely have to send a RACH on the uplink if the tune-away timer has expired. This may help reset any timers at the NW1.

However, if the elapsed time has not exceeded the predetermined time threshold, the UE 106 may assume that the timing relationship between the UE 106 and the network NW1 is still valid. Accordingly, the UE 106 may simply send an SR to the network NW1 (block 313) using the physical uplink control channel (PUCCH) configuration. If the UE 106 receives an acknowledgement grant from the NW1 (block 315), the UE 106 may determine if there is any data to send (block 321). If there is data to send, the UE 106 may send data to the network NW1 (block 323). However, in one embodiment, if there is no data to send (block 321), the UE 106 may send a buffer status report to the NW1 on the physical uplink shared channel (PUSCH), for example. The buffer status report may include a predetermined value such as zero, for example (block 319). In other embodiments, the value may be some other predetermined value. The buffer status report having the predetermined value (e.g., zero) may serve to notify the network NW1 that the UE 106 is back from the tune-away mode.

Referring back to block 315, if the UE 106 does not receive a grant message from the network NW1 in response to the SR sent by the UE 106, the UE 106 may retry the SR a predetermined number of times. In one embodiment, the predetermined number of retries may be programmable. If at any time the network NW1 responds with a grant, the UE may respond as described above in conjunction with the descriptions beginning in block 321. If the number of retires has been exceeded (block 317), the UE 106 may be forced to initiate an SR using the RACE procedure as described above in conjunction with the description of block 325.

Accordingly, providing a notification to a network such as NW1 that the UE 106 supports tune-away operation, and receiving an acknowledgement from the network NW1 that it also supports tune-away operation, may allow a single radio implementation such as the UE 106 tune-away to another network NW2 without causing undue burden on the network NW1 or on the UE 106 due to unnecessary RACE procedure initiations.

Figure 4:
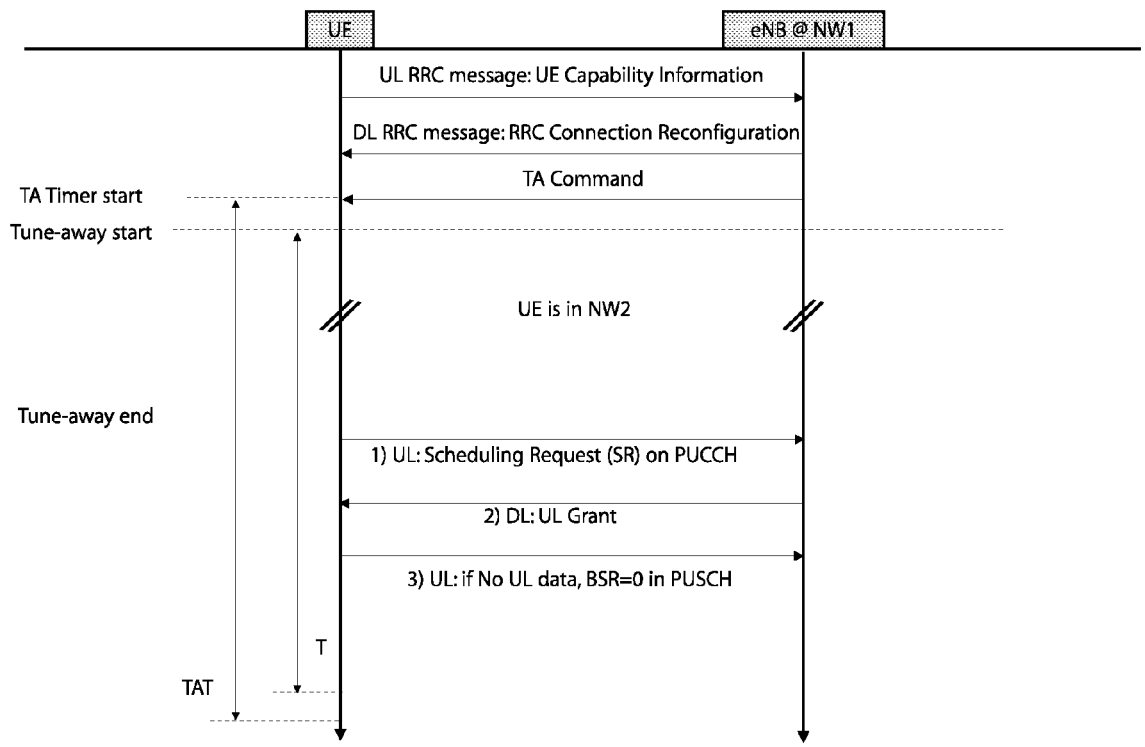
FIG. 4 is a message flow diagram depicting the flow of messages between a network and the wireless communication device of FIG. 1 and FIG. 2 before a tune-away timer expires.
Figure 5:
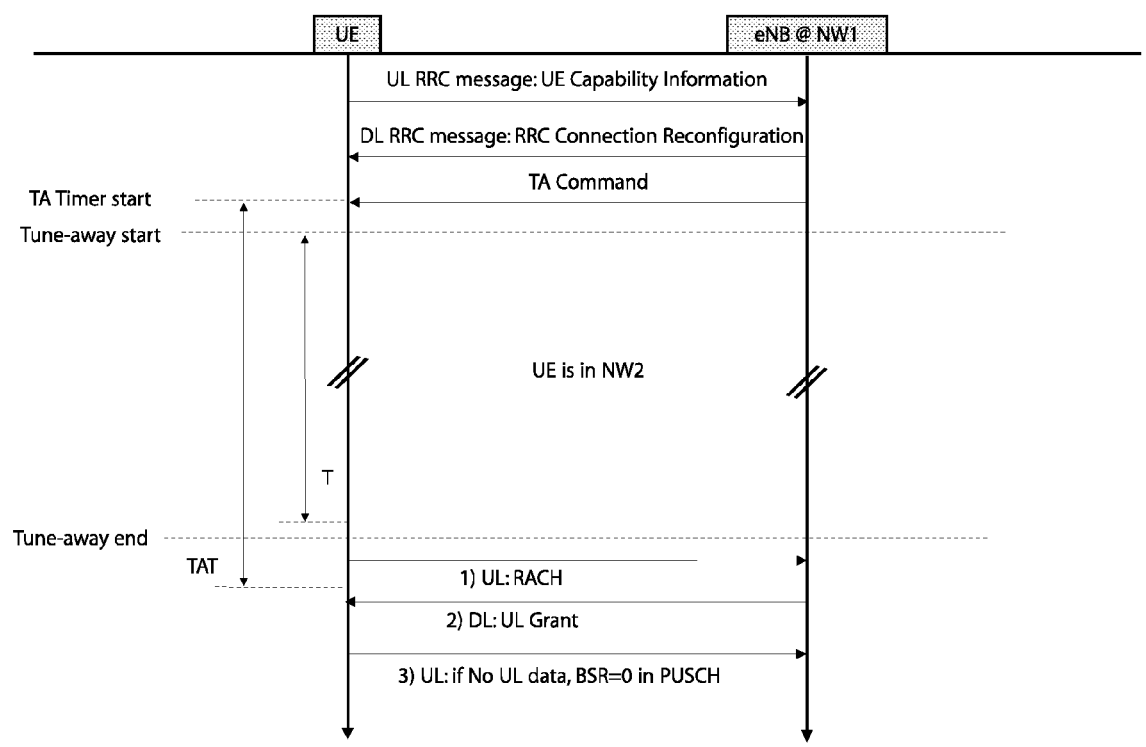
FIG. 5 is a message flow diagram depicting the flow of messages between a network and the wireless communication device of FIG. 1 and FIG. 2 after a tune-away timer expires.

In FIG. 4, a message flow between the UE 106 and the network NW1 in which the tune-away timer has not expired is shown. In FIG. 5, a message flow between the UE 106 and the network NW1 in which the tune-away tinier has expired is shown.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing improved tune-away operations, comprising:
    performing, by a cellular mobile device with a cellular radio having a single transmitter,
        operating, using the cellular radio, according to a first radio access technology to communicate with a first cellular network;
        notifying, using the cellular radio, the first cellular network of a tune-away mode, wherein during a tune-away using the tune-away mode the cellular mobile device is configured to tune-away to a second cellular network using a second radio access technology and to be temporarily non-responsive to the first cellular network while maintaining a signaling connection to the first cellular network, wherein, in response to the notifying, the first cellular network is configured to reduce resource scheduling performed in absence of the notifying during the tune-away;
        subsequent to operation on the first cellular network and while maintaining a signaling connection to the first cellular network, tuning away, using the cellular radio, to the second cellular network according to the second radio access technology to communicate with the second cellular network;
        setting, using the cellular radio, a timer to a predetermined amount of time upon tuning away to monitor an amount of time the cellular mobile device is tuned away; and
        returning, by the cellular radio, to operation on the first cellular network subsequent to the tuning away on the second cellular network, wherein in response to the cellular mobile device tuning away to the second cellular network for a time that is shorter than the predetermined amount of time, the cellular mobile device sending a scheduling request to the first cellular network via the signaling connection even when the cellular mobile device does not have uplink data to send.

2. The method of claim 1, wherein the predetermined amount of time corresponds to a maximum amount of time the cellular mobile device may tune away without using a random access channel (RACH) upon returning to operation on the first cellular network.

3. The method of claim 1, wherein in response to the cellular mobile device tuning away to the second cellular network for a time that is greater than the predetermined amount of time, the cellular mobile device sending a scheduling request to the first cellular network via a random access channel (RACH).

4. The method of claim 1, wherein in response to receiving from the first cellular network, a grant acknowledgement that is responsive to the scheduling request, the cellular mobile device selectively sending to the first cellular network, a buffer status report that includes a predetermined value.

5. The method of claim 4, wherein the predetermined value is zero.

6. The method of claim 1, wherein, in response to the notifying, the first cellular network is not configured to reduce future downlink allocations of the cellular mobile device.

7. A method for performing improved tune-away operations, comprising:
performing, by a cellular mobile device with a cellular radio having a single transmitter;
operating, using the cellular radio, according to a first radio access technology to communicate with a first cellular network;
subsequent to operation on the first cellular network and while maintaining a signaling connection to the first cellular network, tuning away to a second cellular network according to a second radio access technology to communicate with the second cellular network;
setting, using the cellular radio, a timer to a predetermined amount of time upon tuning away to monitor an amount of time the cellular mobile device is tuned away;
returning to operation on the first cellular network subsequent to the tuning away on the second cellular network;
wherein in response to the cellular mobile device tuning away to the second cellular network for a time that is shorter than the predetermined amount of time, the cellular mobile device sending, using the cellular radio, a scheduling request to the first cellular network via the signaling connection to notify the first cellular network that the tune-away operation is complete even if the cellular mobile device does not have uplink data to send.

8. The method of claim 7, wherein the predetermined amount of time corresponds to a maximum amount of time the cellular mobile device may tune away without using a random access channel (RACH) upon returning to operation on the first cellular network.

9. The method of claim 7, further comprising sending the scheduling request to notify the first cellular network that the tune-away operation is complete even if the cellular mobile device does not have uplink data to send.

10. The method of claim 7, wherein in response to the cellular mobile device tuning away to the second cellular network for a time that is greater than the predetermined amount of time, the cellular mobile device sending a scheduling request to the first cellular network via a random access channel (RACH).

11. A cellular mobile device, comprising:
a cellular radio having a single transmitter unit; and
a processor coupled to the cellular radio;
wherein the cellular radio is configured to operate using a first radio access technology to communicate with a first cellular network;
wherein the cellular radio is configured to notify the first cellular network of a tune-away mode, wherein during a tune-away using the tune-away mode the cellular mobile device is configured to tune-away to a second cellular network using a second radio access technology and to be temporarily non-responsive to the first cellular network while maintaining a signaling connection to the first cellular network, wherein, in response to the notifying, the first cellular network is configured to reduce resource scheduling performed in absence of the notifying during the tune-away;
subsequent to operation in the first mode and while maintaining a signaling connection to the first cellular network, the cellular radio is configured to tune away to the second cellular network according to the second radio access technology to communicate with the second cellular network;
wherein the cellular mobile device is configured to set a timer to a predetermined amount of time upon tuning away to monitor an amount of time the cellular mobile device is tuned away; and
wherein the cellular radio is configured to return to operation on the first cellular network subsequent to the tuning away on the second cellular network, wherein in response to the cellular mobile device tuning away to the second cellular network for a time that is shorter than the predetermined amount of time, the cellular radio is configured to send a scheduling request to the first cellular network via the signaling connection even when the cellular mobile device does not have uplink data to send.

12. The cellular mobile device of claim 11, wherein the predetermined amount of time corresponds to a maximum amount of time the cellular mobile device may tune away without using a random access channel (RACH) upon returning to operation on the first cellular network.

13. The cellular mobile device of claim 11, wherein in response to the cellular mobile device tuning away to the second cellular network for a time that is greater than the predetermined amount of time, the cellular mobile device is configured to send a scheduling request to the first cellular network via a random access channel (RACH).

14. The cellular mobile device of claim 11, wherein in response to receiving from the first cellular network, a grant acknowledgement that is responsive to the scheduling request, the cellular mobile device is configured to selectively send to the first cellular network, a buffer status report that includes a predetermined value.

15. The cellular mobile device of claim 11, wherein the cellular radio is further configured to notify the first cellular network of the capability to tune-away to prevent the first cellular network from reducing future downlink allocations of the cellular mobile device.

* * * * *